United States Patent
Flavin et al.

(10) Patent No.: US 10,668,651 B2
(45) Date of Patent: Jun. 2, 2020

(54) PRESSURIZED RAPID CASTING PROCESS

(75) Inventors: Ryan T. Flavin, Canton, MI (US); Bradley P. Van Dike, Livonia, MI (US); Mark W. Wynn, Westland, MI (US); Daniel J. Welker, Newport, MI (US)

(73) Assignee: Yazaki North America, Inc., Canton, MI (US)

( * ) Notice: Subject to any disclaimer, the term of this patent is extended or adjusted under 35 U.S.C. 154(b) by 365 days.

(21) Appl. No.: 13/426,725

(22) Filed: Mar. 22, 2012

(65) Prior Publication Data

US 2013/0249143 A1    Sep. 26, 2013

(51) Int. Cl.
| | | |
|---|---|---|
| *B29C 39/42* | (2006.01) | |
| *B29C 39/00* | (2006.01) | |
| *B29C 33/38* | (2006.01) | |
| *B29C 35/02* | (2006.01) | |
| *B29C 39/26* | (2006.01) | |
| *B33Y 80/00* | (2015.01) | |

(52) U.S. Cl.
CPC .......... *B29C 39/42* (2013.01); *B29C 33/3857* (2013.01); *B29C 35/0227* (2013.01); *B29C 39/006* (2013.01); *B29C 39/26* (2013.01); *B33Y 80/00* (2014.12)

(58) Field of Classification Search
CPC .......... B29C 39/42; B29C 70/04; B29C 70/06
See application file for complete search history.

(56) References Cited

U.S. PATENT DOCUMENTS

| | | | |
|---|---|---|---|
| 2,452,855 A | | 11/1948 | Kempf et al. |
| 3,337,662 A | * | 8/1967 | Spencer .......................... 264/71 |
| 5,818,005 A | * | 10/1998 | Pratt ........................ B23H 1/04 |
| | | | 219/69.15 |
| 6,218,458 B1 | | 4/2001 | Vidaurre et al. |
| 6,344,160 B1 | * | 2/2002 | Holtzberg ..................... 264/102 |
| 7,045,085 B2 | | 5/2006 | Sutton |
| 7,793,703 B2 | | 9/2010 | Wood et al. |
| 2009/0306332 A1 | * | 12/2009 | Kray et al. .................... 528/323 |
| 2010/0181701 A1 | * | 7/2010 | Bartholomew et al. ...... 264/241 |

(Continued)

OTHER PUBLICATIONS

John Andrews Bryson, Plastics Materials, 1999, Butterworth-Heinemann/Reed Educational and Professional Publishing Ltd/ Reed Elsevier Plc Group, Seventh edition, pp. 163, 181, 182, 486, 487, and 500-502.*

(Continued)

*Primary Examiner* — Matthew J Daniels
*Assistant Examiner* — Patrick Butler
(74) *Attorney, Agent, or Firm* — Foley & Lardner LLP

(57) ABSTRACT

A method for molding a component. The method includes: providing a mold tool having a sprue and a cavity; heating the mold tool to a predetermined mold temperature; placing the heated mold tool into a pressure vessel; pouring a material through the sprue into the cavity of the heated mold tool; prior to complete polymerization of the material in the cavity of the heated mold tool, elevating an internal pressure of the pressure vessel to a predetermined pressure to apply a force to the material in the heated mold tool; completely polymerizing the material in the cavity in heated mold tool to form the molded component; and removing the molded component from the mold tool.

19 Claims, 2 Drawing Sheets

(56) References Cited

U.S. PATENT DOCUMENTS

2012/0153528 A1* 6/2012 LaForest ................ B29C 70/48
264/101

OTHER PUBLICATIONS

John Andrews Brydson, Plastics Materials, 1999, Butterworth-Heinemann/Reed Educational and Professional Publishing Ltd/Reed Elsevier Plc Group, Seventh edition, pp. 163, 181, 182, 486, 487, and 500-502.*

* cited by examiner

PRESSURIZED RAPID CASTING PROCESS

FIELD

The present disclosure relates to a pressurized rapid casting process.

BACKGROUND

Methods for rapid manufacturing are known in the art and have traditionally been employed to produce high quality parts in a reduced amount of time. One example of such a rapid manufacturing process is bridge tooling casting for polymeric materials. The rapid casting process generally begins with obtaining a master pattern, such as through an additive manufacturing technology (e.g., stereo lithography). A silicone material is then poured around the master pattern to create both a first member and a second member of a mold tool. A liquefied polymer can then be poured into the coupled members of the mold tool for casting a part.

The time required to produce a part through rapid manufacturing is significantly shorter than with conventional methods such as sheet metal forming, machining, molding, or other methods known in the art. In this way, rapid manufacturing technology can be used to manufacture high quality parts in relatively small numbers for fit, function, and assembly testing; for product samples; and/or for low volume production runs. The impact on new products is a decrease in overall development time by allowing for problems to be identified and for corrections to be made early in the process.

While parts manufactured through rapid manufacturing technologies can and are used in further assemblies, these parts can suffer from limited performance capabilities such as insufficient mechanical properties. Accordingly, methods and operations for optimizing the rapid casting process and for consistently producing parts are necessary.

SUMMARY

This section provides a general summary of the disclosure, and is not a comprehensive disclosure of its full scope or all of its features.

In one form, the present teachings provide a method for molding a component. The method includes: providing a mold tool having a sprue and a cavity; heating the mold tool to a predetermined mold temperature; placing the heated mold tool into a pressure vessel; pouring a material through the sprue into the cavity of the heated mold tool; prior to complete polymerization of the material in the cavity of the heated mold tool, elevating an internal pressure of the pressure vessel to a predetermined pressure to apply a force to the material in the heated mold tool; completely polymerizing the material in the cavity in heated mold tool to form the molded component; and removing the molded component from the mold tool.

In another form, the present teachings provide a method for molding a component. The method includes: heating a mold tool; preparing a first container having a predetermined mass of a catalyst and a first predetermined mass of a monomer and a second container having a predetermined mass of an activator and a second predetermined mass of the monomer; purging the first and second containers with an inert gas; heating the first and second containers to a temperature above a predetermined temperature to form a first constituent element in the first container and a second constituent element in the second container; combining the first and second constituent elements when the first and second constituent elements have a temperature that is greater than the predetermined temperature to form a mixture; pouring the mixture into the heated mold tool; and densifying the mixture in the mold tool prior to complete polymerization of the mixture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
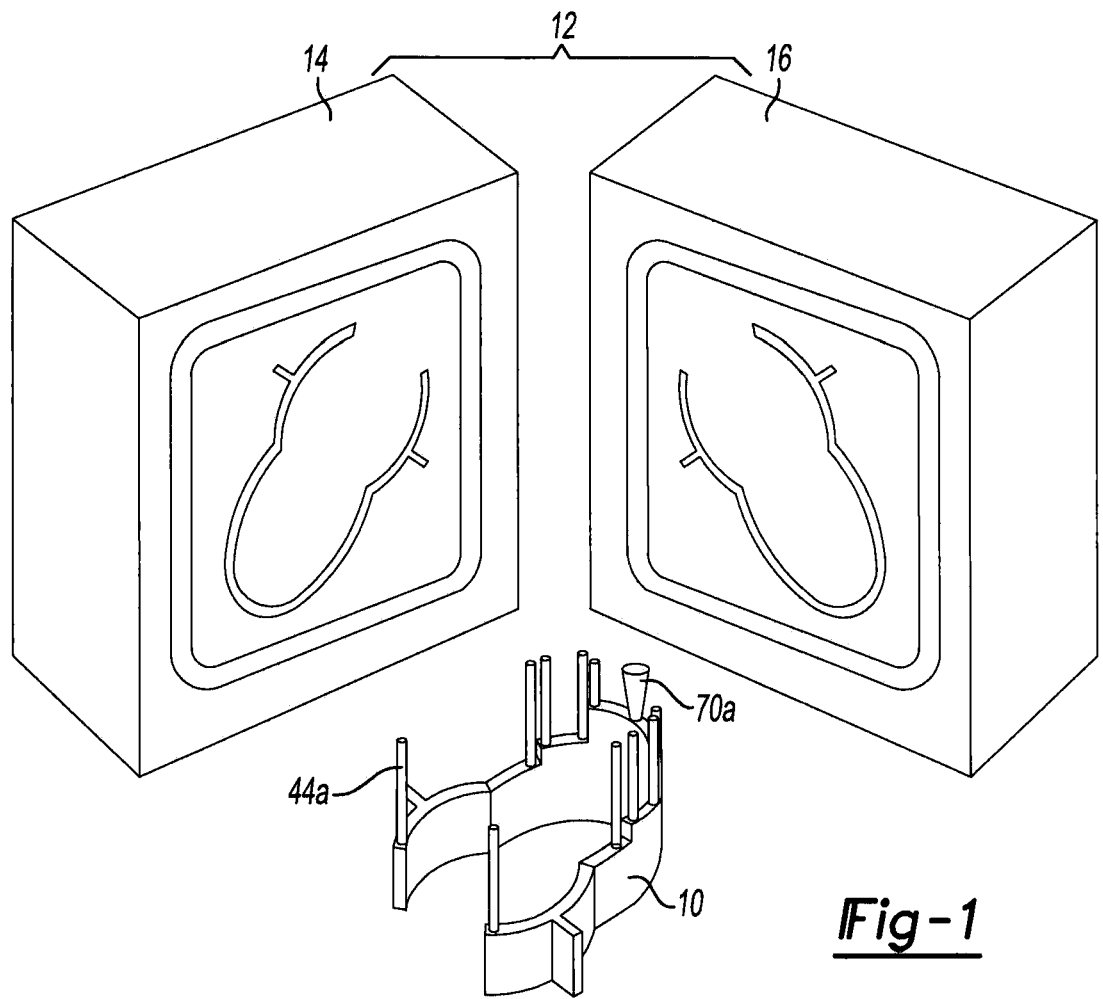
FIG. 1 is an exploded perspective tool of a molded component constructed in accordance with the teachings of the present disclosure, the molded component being shown with a mold tool that is configured to mold the molded component, as well as the molded component as it is removed from the mold tool (with structure corresponding to the sprue and vents in the mold tool)

With reference to FIG. 1 of the drawings, a molded component constructed in accordance with the teachings of the present disclosure is generally indicated by reference numeral 10. The molded component 10 can be formed in a polymerization reaction that takes place in a mold tool 12 when the mold tool 12 is exposed to elevated pressure and temperature as will be discussed in more detail below.

Figure 2:
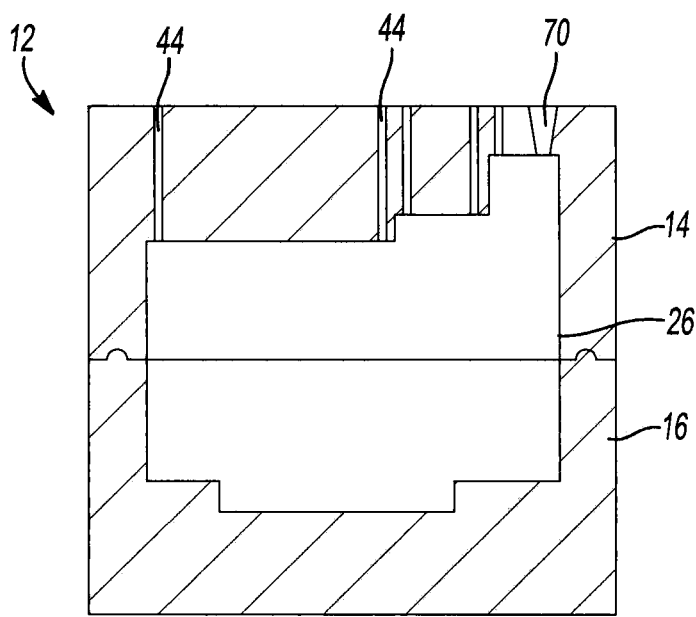
FIG. 2 is a section view of the mold tool of FIG. 1.

With additional reference to FIG. 2, the mold tool 12 can be any type of bridge tooling or soft tooling, and in the particular example provided, the mold tool 12 is a type of soft tooling that is formed of silicone. Briefly, the mold tool 12 can comprise first and second mold members 14 and 16 that cooperate to define a mold cavity 26 and at least one sprue 70. If desired, the mold tool 12 can also define one or more risers (not shown) and/or one or more vents 44. In the particular example provided, an single sprue 70 and a plurality of vents 44 are formed in the first mold member 14. As will be appreciated by those of skill in the art, the sprue 70 and vents 44 extend from the mold cavity through the second mold member 14 and are configured to fluidly couple the mold cavity 26 to the atmosphere (that surrounds the mold tool 12).

Figure 3:
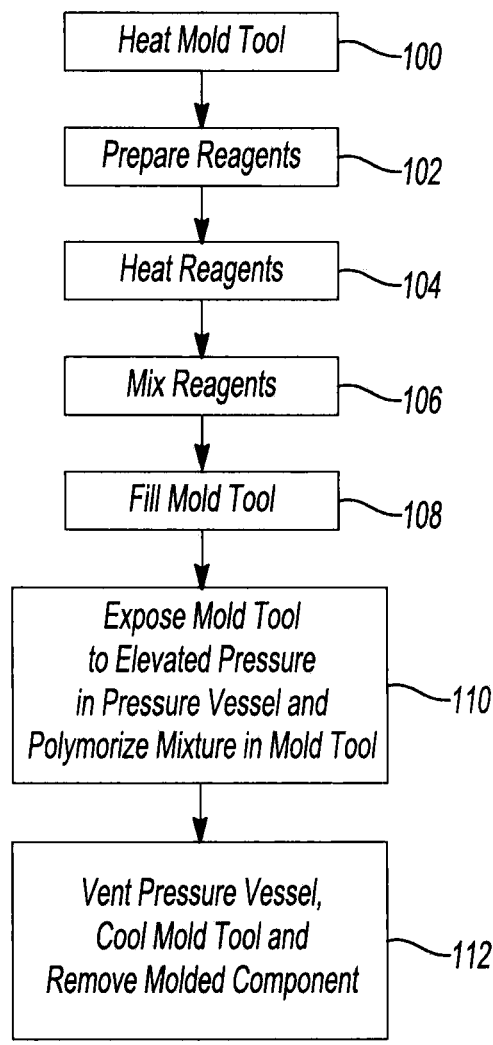
FIG. 3 is a schematic illustration in flow-chart form of a method for forming a molded component in accordance with the teachings of the present disclosure.

With reference to FIGS. 2 and 3, a method for forming the molded component according to the teachings of the present disclosure is schematically illustrated. The methodology begins at block 100, where the mold tool 12 can be heated to a predetermined mold temperature. Preferably, the predetermined mold temperature is an elevated temperature which is sufficient to sustain a chemical reaction between reagents that are introduced to the mold cavity 26 as will be discussed in greater detail below.

The methodology can proceed to block 102, where the reagents used to form the molded component 10 are prepared. In the example provided, a predetermined mass of a catalyst and half of a predetermined mass of a monomer may be weighed and placed in a first container, while a predetermined mass of an activator and another half of the predetermined mass of the monomer may be weighed and placed in a second container. In the particular example provided, the monomer is caprolactam, the catalyst is sodium caprolactamate and the activator is blocked diisocyanate. If the cast material is required to have a specific color, a predetermined mass of appropriate pigment and/or a heat stabilizer may also be placed in one of the containers (e.g., the second container). The first and second containers can be purged of air with a suitable inert gas (e.g., nitrogen). If desired, thermocouples can be inserted into the first and second containers.

The methodology can proceed to block 104, where the contents of the first and second containers can be heated to a predetermined temperature. In the particular example provided, the predetermined temperature exceeds the melting point of the materials that make up the contents of the first and second containers such that the contents of the first and second containers are liquefied. Thereafter, the methodology can proceed to block 106, where the contents of the first and second containers can be combined and mixed thoroughly to form a homogeneous liquefied mixture.

The methodology can proceed to block 108 where the liquefied [polymeric] material can be introduced through the sprue(s) 70 into the mold cavity 26 in the heated mold tool 12 to form a liquid-filled mold tool. Typically, the mold tool 12 is filled with the liquefied mixture to the point where the mold cavity 26 is completely filled and the vents 44 and sprue(s) 70 are at least partly filled.

The methodology can proceed to block 110 where the liquid-filled mold tool can be introduced into a pressure vessel 72 (FIG. 4), the pressure vessel can be closed and a pressurized gas, such as air, may be introduced into the pressure vessel to elevate the gauge pressure within the pressure vessel to a predetermined gauge pressure. It will be appreciated that the pressurized gas within the pressure vessel will act directly on the liquefied mixture through the sprue(s) 70 and vents 44. In the case where a form of soft tooling is used for the mold tool 12, the pressurized gas can also exert a force over the exterior surface of the mold tool 12 that will apply a compressive force to the liquefied mixture that resides in the mold tool 12.

Figure 4:
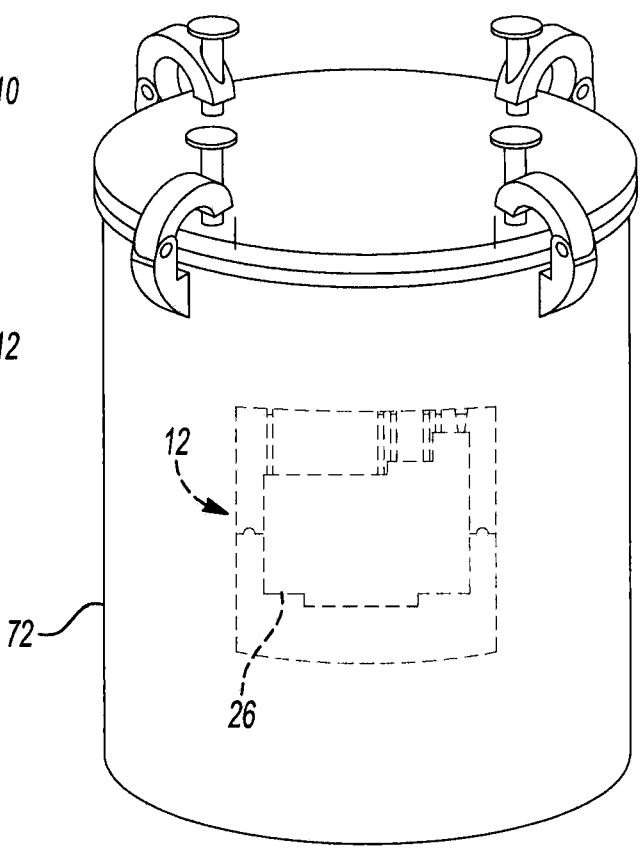
FIG. 4 is a perspective view of a pressure vessel into which the mold tool of FIG. 1 is positioned.

In some instances, it can be beneficial to elevate the pressure in the pressure vessel 72 (FIG. 4) to the predetermined gauge pressure within a predetermined time span after the first and second components have been mixed (in block 106). For example, a time span that is less than or equal to 60 seconds may be employed to ensure that polymerization of the liquefied mixture starts to take place only after the liquefied mixture is introduced to the mold cavity 26 and has been exposed to the predetermined gauge pressure in the pressure vessel 72 (FIG. 4). Stated another way, the predetermined time span can be shorter than a reaction time needed to initiate polymerization of the liquefied mixture, and/or can be shorter than a time at which the material (i.e., the liquefied mixture) ceases to behave as a fluid when exposed to the predetermined (gauge) pressure. Performance of the methodology in this manner permits the molded component 10 (FIG. 1) to achieve a uniform density. It may be satisfactory, however, to use a different (e.g., longer) time span in situations where it would be permissible to expose the liquefied mixture to the predetermined gauge pressure in the pressure vessel 72 (FIG. 4) after polymerization of the liquefied mixture has started to take place.

Pressure within the pressure vessel 72 (FIG. 4) can be maintained for a predetermined dwell time at the predetermined gauge pressure to permit the liquefied mixture to completely polymerize. As will be appreciated by those of skill in the art, suitable pressures and dwell times can vary depending on the desired structural properties and/or the surface area and/or volume of the molded component. We believe that suitable predetermined gauge pressures can range from 40 p.s.i.g. to 120 p.s.i.g., and suitable predetermined dwell times can range between 10 to 20 minutes. In the particular example provided, the liquefied mixture polymerizes to form AP Nylon 6, the predetermined gauge pressure is 80 p.s.i.g. and the predetermined gauge pressure is maintained on the mold tool 12 (in the pressure vessel) for 20 minutes.

The elevated pressure that acts on the liquefied mixture in the mold tool 12 helps to compact the resulting polymer so that the density of the molded component 10 (FIG. 1) is relatively denser than would otherwise occur if the molded component was to be formed at ambient air pressure (i.e., 0 p.s.i.g.).

After elapse of the predetermined dwell time, the methodology can proceed to block 112, where the pressure vessel 72 (FIG. 4) is vented and the mold tool 12 is cooled to a desired temperature. It will be appreciated that the elevated pressure may be maintained on the mold tool 12 while the mold tool 12 is cooled (after which the pressure vessel is vented), or that the pressure vessel could be vented prior to the (desired) cooling of the mold tool 12.

In block 114, the molded component 10 (FIG. 1) is removed from the mold tool 12 and finished in a desired manner. For example, material corresponding to the vents 44 and the sprue 70 (i.e., materials 44a and 70a in FIG. 1) may be removed from the molded component 10.

While the above methodology has been described as including the placement of a heated, liquid mixture-filled mold tool into a pressure vessel, those of skill in the art will appreciate that in the alternative the heated mold tool may be placed within the pressure vessel and thereafter filled with the liquid mixture.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for molding a component, the method comprising:
    heating a soft mold tool comprising silicone and having a sprue and a cavity to a predetermined mold temperature to form a heated soft mold tool;
    placing the heated soft mold tool into a pressure vessel;
    pouring a material comprising a monomer, a catalyst, and an activator through the sprue into the cavity of the heated soft mold tool;
    prior to initiating polymerization of the material to form a Nylon 6 polymer in the cavity of the heated soft mold tool, elevating an internal pressure of the pressure vessel to a predetermined pressure that is greater than 40 p.s.i.g. and less than 120 p.s.i.g. to apply a compressive force through exterior surfaces surrounding the cavity of the heated soft mold tool towards the material contained in the cavity of the heated soft mold tool;

initiating and completely polymerizing the material in the cavity in the heated soft mold tool for a predetermined dwell time of less than or equal to 20 minutes to form the molded component comprising the Nylon 6 polymer, wherein the predetermined mold temperature is sufficient to sustain polymerization of the material; and removing the molded component from the mold tool;

wherein after the pouring and the elevating of the internal pressure, the pressure vessel consists of the material, pressurized gas, and the heated soft mold tool consisting of a first mold member and a second mold member, which define the cavity.

2. The method of claim 1, wherein prior to pouring the material through the sprue into the cavity of the heated mold tool the method further comprises:

providing a first mixture that comprises a predetermined mass of the catalyst and the first predetermined mass of a monomer;

providing a second mixture that comprises a predetermined mass of the activator and the second predetermined mass of the monomer;

heating the first and second mixtures to liquefy the first and second mixtures; and combining the first and second mixtures when the first and second mixtures have liquefied.

3. The method of claim 2, wherein the catalyst is sodium caprolactamate and the activator is blocked di-isocyanate.

4. The method of claim 2, wherein the monomer is caprolactam.

5. The method of claim 2, wherein at least one of the first and second mixtures further comprises at least one of a pigment and a heat stabilizer.

6. The method of claim 2, wherein before heating the first and second mixtures the method further comprises purging an environment about the first and second mixtures with an inert gas.

7. The method of claim 2, wherein elevating the internal pressure of the pressure vessel to the predetermined pressure is completed in a predetermined time span that begins once the first and second mixtures have been combined and ends prior to initiation of polymerization of the material comprising the first and second mixtures.

8. The method of claim 7, wherein the predetermined time span is less than or equal to 60 seconds.

9. The method of claim 8, further comprising maintaining the internal pressure of the pressure vessel between 40 p.s.i.g. and 120 p.s.i.g. until polymerization of the first and second mixtures is complete.

10. The method of claim 1, wherein the heated mold tool is placed into the pressure vessel before the material is poured through the sprue into the cavity of the heated mold tool.

11. The method of claim 1, wherein elevating the internal pressure of the pressure vessel to the predetermined pressure is completed before a time at which the material ceases to behave as a fluid when exposed to the predetermined pressure.

12. A method for molding a component, the method comprising:

heating a soft mold tool comprising silicone and having a sprue and a cavity to form a heated soft mold tool;

placing the heated soft mold tool into a pressure vessel;

preparing a first container having a predetermined mass of a catalyst and a first predetermined mass of a monomer and a second container having a predetermined mass of an activator and a second predetermined mass of the monomer;

purging the first and second containers with an inert gas;

heating the first and second containers to a temperature above a predetermined temperature to form a first constituent element in the first container and a second constituent element in the second container;

combining the first and second constituent elements when the first and second constituent elements have a temperature that is greater than the predetermined temperature to form a mixture;

pouring the mixture into the heated soft mold tool;

prior to initiating polymerization of the mixture, elevating an internal pressure of the pressure vessel to a predetermined pressure that is greater than 40 p.s.i.g. and less than 120 p.s.i.g.;

densifying and polymerizing the mixture in the heated soft mold tool to form a Nylon 6 polymer by applying pressure through exterior surfaces surrounding the cavity of the heated soft mold tool towards the mixture contained in the cavity; and after complete polymerization of the mixture, removing the molded component from the soft mold tool;

wherein after the pouring and the elevating the internal pressure, the pressure vessel consists of the mixture, pressurized gas, and the heated soft mold tool consisting of a first mold member and a second mold member, which define the cavity.

13. The method of claim 12, wherein the catalyst is a sodium caprolactamate, the activator is a blocked di-isocyanate, and the monomer is a caprolactam.

14. The method of claim 12, wherein before heating the first and second containers the method further comprises placing a predetermined mass of a pigment in the second container.

15. The method of claim 12, wherein before combining the first and second constituent elements, the first and second containers are maintained above the predetermined temperature.

16. A method for molding a component, the method comprising:

preparing a first container having a predetermined mass of a catalyst and a first predetermined mass of a caprolactam monomer;

preparing a second container having a predetermined mass of an activator and a second predetermined mass of the caprolactam monomer;

heating the first and second containers to a temperature above a melting point of the caprolactam monomer to form a first liquid constituent element in the first container and a second liquid constituent element in the second container;

combining the first and second liquid constituent elements to form a mixture;

placing a soft mold tool comprising silicone and having a sprue and a cavity into a pressure vessel;

heating the soft mold tool above a predetermined temperature that is sufficient to sustain polymerization of the caprolactam monomer to form a heated soft mold tool, wherein the soft mold tool is heated before being placed into the pressure vessel;

pouring the mixture into the heated soft mold tool;

prior to initiating polymerization of the mixture, elevating an internal pressure of the pressure vessel to a predetermined pressure that is greater than 40 p.s.i.g. and less than 120 p.s.i.g. to apply compressive force through exterior surfaces surrounding the cavity of the heated soft mold tool towards the mixture contained in the cavity; and densifying and polymerizing the mixture to form a Nylon 6 polymer for a predetermined dwell time of less than or equal to 20 minutes in the heated soft mold tool, wherein during the densifying and polymerizing, the internal pressure of the pressure vessel is maintained between 40 p.s.i.g. and 120 p.s.i.g. until polymerization of the mixture is complete;

wherein after the pouring and the elevating the internal pressure, the pressure vessel consists of the mixture, pressurized gas, and the heated soft mold tool consisting of a first mold member and a second mold member, which define the cavity.

17. The method of claim 16, wherein the soft mold tool is placed into the pressure vessel before the mixture is poured into the heated soft mold tool.

18. A method for molding a component, the method comprising:

heating a soft mold tool comprising silicone and having a sprue and a cavity to a predetermined mold temperature to form a heated soft mold tool;

placing the heated soft mold tool into a pressure vessel;

pouring a material comprising a monomer, a catalyst, and an activator through the sprue into the cavity of the heated soft mold tool;

prior to initiating polymerization of the material to form a Nylon 6 polymer in the cavity of the heated soft mold tool, elevating an internal pressure of the pressure vessel to a predetermined pressure that is greater than 40 p.s.i.g. and less than 120 p.s.i.g. to apply a compressive force through exterior surfaces surrounding the cavity of the heated soft mold tool towards the material contained in the cavity of the heated soft mold tool, wherein after the pouring and the elevating of the internal pressure, the pressure vessel consists of the the material, pressurized gas, and the heated soft mold tool consisting of a first mold member and a second mold member, which define the cavity;

densifying and polymerizing the material to form a molded component comprising Nylon 6 polymer in the cavity of the heated soft mold tool for a predetermined dwell time of less than or equal to 20 minutes, wherein during the densifying and polymerizing, the internal pressure of the pressure vessel is maintained between 40 p.s.i.g. and 120 p.s.i.g. until polymerization of the mixture is complete and the predetermined mold temperature is sufficient to sustain polymerization of the material; and removing the molded component from the mold tool.

19. The method of claim 18, wherein the material consists essentially of a monomer, a catalyst, an activator, an optional pigment, and an optional heat stabilizer and the molded component is capable of use for testing or as a production component.

* * * * *